Patented Aug. 13, 1940

2,211,538

UNITED STATES PATENT OFFICE 2,211,538

SYNTHESIS OF QUINOLINE DERIVATIVES

Francis D. Dodge, Cranford, N. J., assignor to Dodge & Olcott Company, Bayonne, N. J., a corporation of New York No Drawing. Application November 8, 1938, Serial No. 239,505

5 Claims.  (Cl. 260—289)

My present invention relates to a novel method of synthesizing quinoline derivatives. More particularly, it relates to the synthesis of quinoline sulfonic and quinoline carboxylic acids.

In the industrial manufacture of anisaldehyde and piperonal (heliotropine), the phenol ethers, anethol and isosafrol are oxidized by a mixture of sodium bichromate and dilute sulfuric acid. It has been found that the reaction is improved as to yield if during the oxidation there are present aromatic amino derivatives, such as sulfanilic or amino-benzoic acids, and, for economic reasons, sulfanilic acid is generally employed.

As is usual in such reactions, various by-products are obtained, and my attention was attracted to certain compounds which appeared, especially when the amount of sulfanilic acid employed was increased. These compounds remained as insoluble sediment after extracting the aldehydes by organic solvents, and I found that said residues could be readily purified by solution in dilute alkali and re-precipitation by acid. After purification, they showed the properties of complex sulfonic acids, which were obviously derived from the sulfanilic acid employed.

Experimentation established that direct oxidation of sulfanilic acid, or of a mixture of sulfanilic acid and anisaldehyde did not yield the insoluble compound above referred to. However, oxidation of sulfanilic acid and anisaldehyde in the presence of acetaldehyde or alcohol gave good yields of the new compound. From these experiments I inferred that the compounds were probably 2-phenyl quinoline sulfonic acids and were produced by a reaction somewhat analogous to the Döbner and von Miller Synthesis. This hypothesis was confirmed by examination of the simpler derivative obtained from benzaldehyde, in which the reaction is evidently:

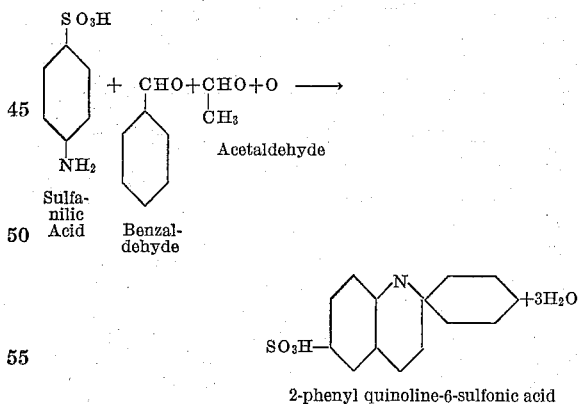

2-phenyl quinoline-6-sulfonic acid

Where anethol is used the formation of the resulting compound may be explained in two ways:

(1) Direct formation without breaking the propylene chain:

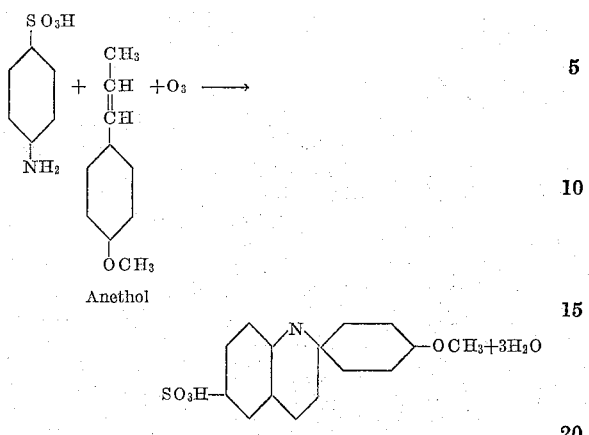

[2 (4′ methoxyphenyl) quinoline-6-sulfonic acid or (2), first oxidation of the anethol to anisaldehyde and acetaldehyde and subsequent condensation of the latter two with sulfanilic acid:

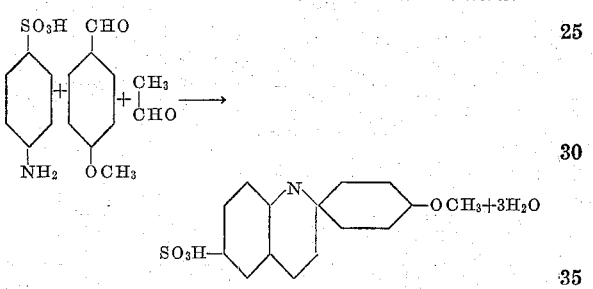

Inasmuch as acetaldehyde is abundantly formed in the oxidation, the latter hypothesis seems more probable.

By oxidation of a mixture of benzaldehyde, sulfanilic acid and ethyl alcohol, with chromic acid mixture, i. e., a mixture of sodium bicarbonate and sulphuric acid, sometimes called "Beckmann's Reagent", a white crystalline acid was obtained, in good yield, showing the neutralization equivalent 290 (calculated for 2-phenyl quinoline sulfonic acid, 285). By distillation of the ammonium salt, a product melting at 83–84° was obtained, which gave the picrate and mercuric chloride compounds characteristic of 2-phenyl quinoline, and was found to be identical with the 2-phenyl quinoline obtained from cinnamaldehyde by Döbner's reaction or by the decomposition of "cinchophen" (2-phenyl quinoline-4-carboxylic acid).

The new reaction I found to be of wide applicability, for example, instead of benzaldehyde, other substituted aromatic aldehydes could be employed; for sulfanilic acid, other amino sulfonic and amino carboxylic acids might be utilized; and in place of ethyl alcohol certain aldehydes, primary alcohols, certain glycols and other alcoholic derivatives also reacted in an analogous manner.

The various substances which I have so far found react in accordance with this synthesis to form quinoline sulfonic acids may be tabulated as follows:

Benzaldehyde
Anisaldehyde
Piperonal
Methyl vanillin } with sulfanilic acid, and alcohol
Methyl salicylaldehyde
p-Tolyl aldehyde
Cuminic aldehyde Benzaldehyde, with { p-Aminobenzoic acid
Anthranilic acid } and alcohol
Metanilic acid Benzaldehyde, with sulfanilic acid and { Propyl alcohol
Butyl alcohol
Propylene glycol
Glycerin
Malic acid
Lactic acid It is obvious that a large number of new acids are thus rendered available by my invention.

By using substituted benzaldehydes (e. g. anisaldehyde, piperonal, methyl vanillin, p-tolyl aldehyde, etc.) 2-phenyl quinoline derivatives, substituted in the 2-phenyl ring, are obtained.

By using various aromatic amino sulfonic or amino carboxylic acids (e. g., metanilic acid anthranilic acid, meta or para amino benzoic acids, etc.) 2-phenyl quinoline derivatives, substituted in the 5, 6, 7 or 8 position, result.

By using certain other alcoholic derivatives (e. g. propanol, butanol, propylene glycol, lactic or malic acids, etc.) 2-phenyl quinoline derivatives, substituted in the pyridine ring (3 or 4 position) may be obtained.

The quinoline sulfonic and carboxylic acids obtained by the synthesis of the present invention are generally quite insoluble in water. The alkaline salts are also only moderately soluble and may be easily "salted" out. The purification of the acids is thus not difficult. The salts with the ethanol-amines are, however, easily soluble and may also be used for purification.

Examples (1) Preparation of 2-phenyl quinoline-6-sulfonic acid.

In lead-lined, or enamel closed tanks, fitted with agitator and cooling coil, are mixed in the order given:

| | Parts |
|---|---|
| Sodium bichromate | 12 |
| Water | 40 |
| Sulfanilic acid, finely powdered | 10 |
| 95% alcohol | 20 |
| Benzaldehyde | 5 |

Sulfuric acid (50%), 40 parts is now run in slowly, with agitation, the temperature being kept at 15-20° C.

After an hour or so the new acid appears in yellow crystals. Agitation is continued and the temperature is kept at 20° for several hours. The mixture is let stand over night, then filtered and the crude acid washed clean with water.

The crude acid amounts to 9 to 10 parts and may be purified by crystallization of the ammonium salt. The melting point of the purified compound could not be definitely ascertained owing to decomposition.

Alternatively, the crude acid may be dissolved as triethanolamine salt and the filtered solution treated with sodium chloride or ammonium chloride, thus yielding the rather insoluble sodium or ammonium salts, which may then be re-crystallized.

The same process may be followed with anisaldehyde, piperonal and the other aldehydes already mentioned.

The sulfonic acids are often decidedly yellow, which is probably due to some impurity hard to remove.

(2) Preparation of 2-phenyl quinoline-5 (or 7?) sulfonic acid

Process followed as in (1), using:

| | Parts |
|---|---|
| Sodium bichromate | 27 |
| Water | 27 |
| Metanilic acid | 20 |
| 95% alcohol | 60 |
| Benzaldehyde | 15 |
| 50% sulfuric acid | 105 |

Yield of crude sulfonic acid, about 20 parts. Purification, as in (1), produced a compound having a melting point of about 300° C.

(3) Preparation of 2-phenyl quinoline-6-carboxylic acid

Process followed as in (1), using:

| | Parts |
|---|---|
| Sodium bichromate | 27 |
| Water | 57 |
| 95% alcohol | 30 |
| Para-amino-benzoic acid | 20 |
| Benzaldehyde | 15 |
| 30% sulfuric acid | 156 |

Yield of crude carboxylic acid, about 27 parts. Purification by crystallization of the ammonium salt produced a compound having a melting point of 284-285° C.

(4) Preparation of 2-phenyl-3 (or 4?) ethyl quinoline-6-sulfonic acid

Process followed as in (1), using:

| | Parts |
|---|---|
| Sodium bichromate | 12 |
| Water | 22 |
| Sulfanilic acid | 10 |
| Butanol | 10 |
| Benzaldehyde | 6 |
| 50% sulfuric acid | 45 |

Yield of crude sulfonic acid, about 11 parts. Purification by means of the rather insoluble sodium salt, produced a compound having a melting point somewhat above 310° C.

The new process has certain advantages over the known quinoline syntheses, to wit:

(1) The raw materials are relatively cheap intermediates whereas a number of the known syntheses require expensive and rather inaccessible products such as ortho-amido benzaldehyde, ortho-amido cinnamic acid, isatin, etc.

(2) The reaction takes place easily at moderate temperatures even at 0° C. and the yields are generally satisfactory.

(3) The reaction occurring in an oxidizing medium prevents the formation of hydrogenated by-products, which latter constitute an objectionable feature of the Döbner and von Miller process (the quinaldine synthesis and the cinchoninic acid reaction).

(4) In the well known Skraup method this difficulty is obviated to some extent by the use of oxidizing agents such as nitro benzol. The Skraup method, however, has as its objections, the necessity of using strong acid, high temperatures, the explosive tendency of the reaction, and its low yields.

The sulfonic and carboxylic acids obtained by this process are, as far as I am aware, new products.

Although I have not as yet found any definite use for the new class of compounds produced by my invention, a closely related compound, 2-phenyl quinoline-4-carboxylic acid, has found extended medical use under the names Atophan or Cinchophene, and the present interest in sulphonated amido compounds (sulfanilamide, Prontylin, Prontosil, etc.) indicates the probability that some of the new products capable of formation by the synthesis disclosed may be of therapeutic or other value.

What I claim is:

1. The synthesis of quinoline derivatives which comprises reacting a benzaldehyde free from OH and $NH_2$ groups, an acid selected from the class of amino-benzene-sulfonic acids and amino-benzene-carboxylic acids, said acids having no free OH group, and a member selected from the class consisting of aliphatic monatomic alcohols, propylene glycol and glycerine, capable of supplying the —CH=CH— group for forming the pyridine ring, the said reaction being carried out in the presence of an oxidizing agent consisting of an alkali bichromate and sulphuric acid at room temperature.

2. The synthesis of phenyl quinoline derivatives of the general formula

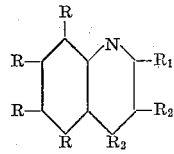

where one R is selected from the class consisting of sulfo and carboxylic groups, and the other R's are hydrogen, $R_1$ is selected from the class consisting of phenyl, alkyl phenyl, and alkoxy phenyl, and one $R_2$ is selected from the class consisting of hydrogen, alkyl and carboxyl, and the other $R_2$ is hydrogen, which comprises reacting a benzaldehyde free from OH and $NH_2$ groups, an acid selected from the class of amino-benzene-sulfonic acids and amino-benzene-carboxylic acids, said acids having no free OH group, and a compound selected from the class consisting of aliphatic monatomic alcohols, propylene glycol and glycerine, capable of supplying the —CH=CH— group for forming the pyridine ring, the said reaction being carried out in the presence of an oxidizing agent consisting of an alkali bichromate and sulphuric acid at room temperature.

3. The method of preparing 2-phenyl quinoline sulfonic acids having the $HSO_3$ group in the phenyl ring of the quinoline group, which comprises reacting a benzaldehyde free from OH and $NH_2$ groups, an amino-benzene-sulfonic acid having no free OH group and ethyl alcohol, the said reaction being carried out in an oxidizing solution consisting of an alkali bichromate and sulphuric acid at room temperature.

4. The method of preparing 2-(4'-methoxyphenyl) quinoline-6-sulfonic acid, which comprises reacting sulfanilic acid, anisaldehyde and ethyl alcohol in the presence of an alkali bichromate and sulphuric acid at room temperature.

5. The method of preparing 2-phenyl-quinoline-6-sulfonic acid, which comprises reacting benzaldehyde, sulfanilic acid and ethyl alcohol in the presence of an alkali bichromate and sulphuric acid at room temperature.

FRANCIS D. DODGE.

CERTIFICATE OF CORRECTION.

Patent No. 2,211,538. August 13, 1940.

FRANCIS D. DODGE.

It is hereby certified that error appears in the printed specification of the above numbered patent requiring correction as follows: Page 1, second column, line 41-42, for "bicarbonate" read --bichromate--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.